US009995849B2

(12) United States Patent
Kalagnanam et al.

(10) Patent No.: US 9,995,849 B2
(45) Date of Patent: Jun. 12, 2018

(54) AIRBORNE PARTICULATE SOURCE DETECTION SYSTEM

(71) Applicant: International Business Machines Corporation, Armonk, NY (US)

(72) Inventors: Jayant Kalagnanam, Briarcliff Manor, NY (US); Liu Xiao, Singapore (SG); Kyong Min Yeo, Scarsdale, NY (US); Yinsheng Zhou, Singapore (SG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 14/965,291

(22) Filed: Dec. 10, 2015

(65) Prior Publication Data
US 2016/0377430 A1    Dec. 29, 2016

Related U.S. Application Data

(63) Continuation of application No. 14/747,522, filed on Jun. 23, 2015.

(51) Int. Cl.
*G01C 15/00* (2006.01)
*G01W 1/02* (2006.01)
*G01W 1/10* (2006.01)
*G01W 1/00* (2006.01)

(52) U.S. Cl.
CPC .............. *G01W 1/10* (2013.01); *G01W 1/00* (2013.01)

(58) Field of Classification Search
CPC .......... G01C 15/00; G01W 1/10; G06N 5/04; G01N 33/006; G01N 33/18; G06F 17/30241
See application file for complete search history.

(56) References Cited

U.S. PATENT DOCUMENTS

2010/0262614 A1* 10/2010 McGinley ......... G06F 17/30241
707/758
2017/0086018 A1* 3/2017 Wagner .................. G06Q 20/12
2017/0256283 A1* 9/2017 Yajima ............. G11B 20/10527

* cited by examiner

*Primary Examiner* — Evan Pert
*Assistant Examiner* — Changhyun Yi
(74) *Attorney, Agent, or Firm* — Cantor Colburn LLP; Daniel Morris

(57) ABSTRACT

A method comprises receiving data associated with a detection of the odor, the data associated with the detection of the odor comprising a location of the detection of the odor and a time of the detection of the odor, retrieving weather data corresponding to the detection of the odor, the weather data including a wind speed and direction in the location of the detection of the odor at the time of the detection of the odor, calculating a location of the source of the odor as a function of the location of the detection of the odor, the time of the location of the odor and the wind speed and direction in the location of the detection of the odor, and outputting to a user on a display a graphical representation of a likely area that includes the location of the source of the odor.

6 Claims, 5 Drawing Sheets

AIRBORNE PARTICULATE SOURCE DETECTION SYSTEM

DOMESTIC PRIORITY

This application is a continuation of U.S. Non-Provisional application Ser. No. 14/747,522, entitled "AIRBORNE PARTICULATE SOURCE DETECTION SYSTEM", filed Jun. 23, 2015, which is incorporated herein by reference in its entirety.

BACKGROUND

The present invention relates to detecting the source of airborne particulates, and more specifically, to detecting the source location of odors using a mobile device system.

Odors can often indicate hazardous events such as chemical spills, gas leaks, or sewage system leaks. Odor source detection in urban areas can be challenging due to the complexity and density of urban environments. Previous methods for locating sources of odors used robots or other specialized sensing equipment to find the source of odors. Typically these systems used sensing equipment that would detect a concentration of molecules that caused odors in an air sample. Sensing equipment often fails to reliably detect a concentration of molecules in an open atmosphere unless the concentration of molecules is sufficiently high to be detected by the sensing equipment. Such systems are often expensive and difficult to calibrate and maintain.

Rapidly locating the source of an odor is desirable for urban administrators and first responders.

SUMMARY

According to one embodiment of the present invention, a method for detecting a source of an odor, the method comprises receiving data associated with a first detection of the odor, the data associated with the first detection of the odor comprising a location of the first detection of the odor and a time of the first detection of the odor, retrieving weather data corresponding to the first detection of the odor, the weather data including a wind speed and direction in the location of the first detection of the odor at the time of the first detection of the odor, calculating a location of the source of the odor as a function of the location of the first detection of the odor, the time of the first location of the odor and the wind speed and direction in the location of the first detection of the odor, and outputting to a user on a display a graphical representation of a likely area that includes the location of the source of the odor.

According to another embodiment of the present invention, system for detecting a source of an odor comprising a display, a processor communicatively connected to the display, the processor operative to receive data associated with a first detection of the odor, the data associated with the first detection of the odor comprising a location of the first detection of the odor and a time of the first detection of the odor, retrieve weather data corresponding to the first detection of the odor, the weather data including a wind speed and direction in the location of the first detection of the odor at the time of the first detection of the odor, calculate a location of the source of the odor as a function of the location of the first detection of the odor, the time of the first detection of the odor and the wind speed and direction in the location of the first detection of the odor, and outputting to a user on a display a graphical representation of a likely area that includes the location of the source of the odor.

According to yet another embodiment of the present invention, a computer program product comprising a computer readable storage medium having program instructions embodied therewith, the program instructions executable by a processor to cause the processor to perform a method that comprises receiving data associated with a first detection of the odor, the data associated with the first detection of the odor comprising a location of the first detection of the odor and a time of the first detection of the odor, retrieving weather data corresponding to the first detection of the odor, the weather data including a wind speed and direction in the location of the first detection of the odor at the time of the first detection of the odor, calculating a location of the source of the odor as a function of the location of the first detection of the odor, the time of the first location of the odor and the wind speed and direction in the location of the first detection of the odor, and outputting to a user on a display a graphical representation of a likely area that includes the location of the source of the odor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Previous systems for detecting the source of airborne particulates that caused odors used detectors that measured the concentration of molecules in samples of air. Such systems and methods are expensive and have low success rates in urban environments.

The methods and systems described herein determine the source of particulates or odors without using specialized concentration detectors.

Figure 1:
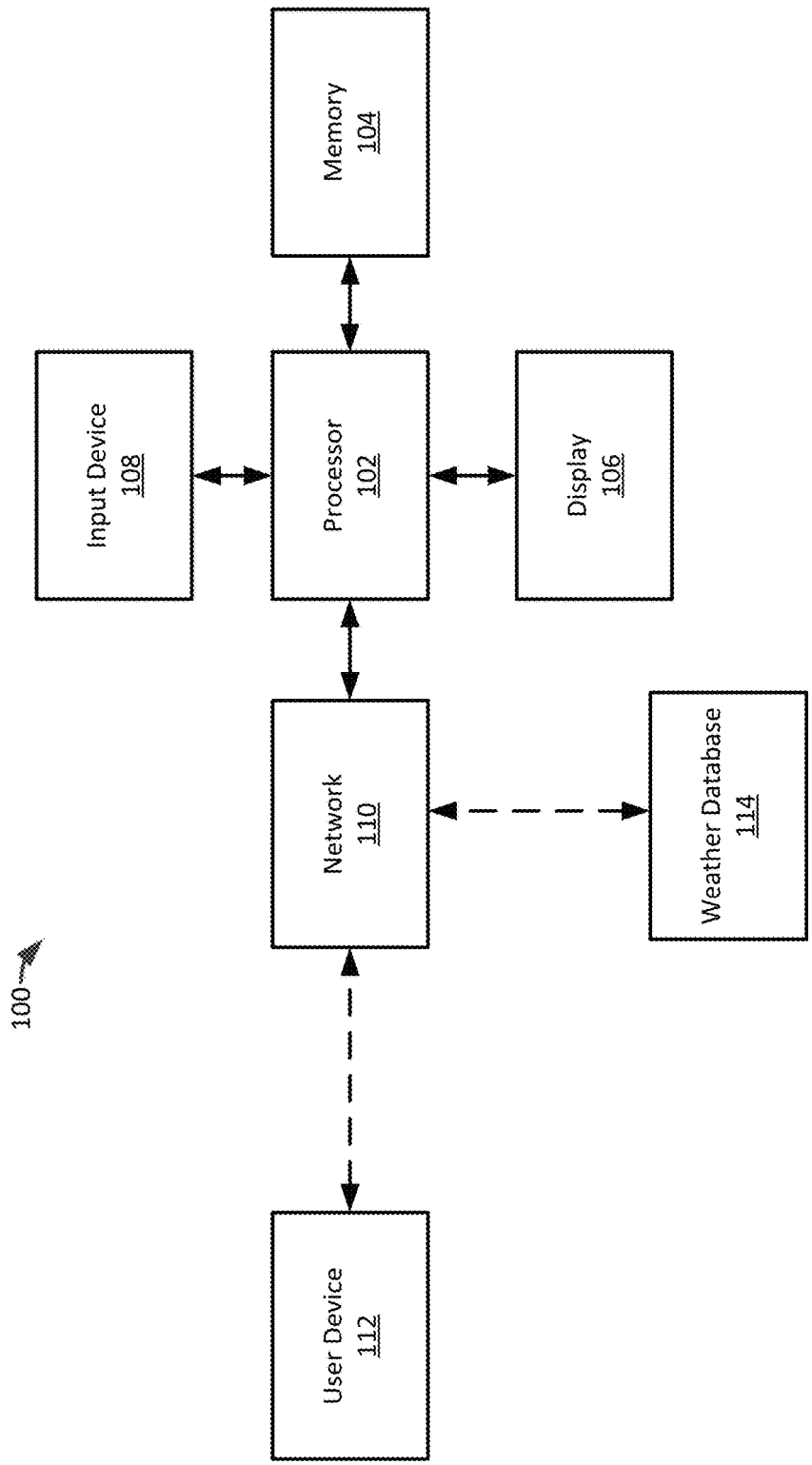
FIG. 1 illustrates an exemplary system for identifying a source of odors.

FIG. 1 illustrates an exemplary system 100 for identifying a source of odors. The system 100 includes a processor (server) 102 that is communicatively connected to a memory 104, a display 106, an input device 108, and a network 110. The system 100 includes a user device 112 such as, for example, a mobile device such as a smart phone. The system 100 may also be communicatively connected to a weather database 114 such as, for example, a national or local weather database.

Figure 2:
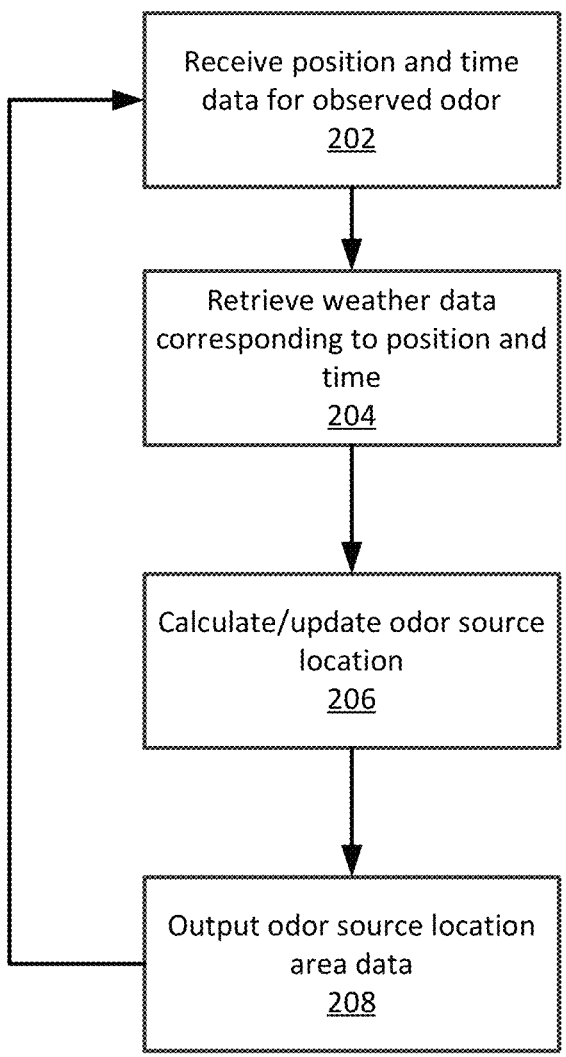
FIG. 2 illustrates a block diagram of an exemplary method of operation of the system of FIG. 1.

FIG. 2 illustrates a block diagram of an exemplary method of operation of the system 100 (of FIG. 1). In block 202, the processor 102 receives position and time data for an observed odor. The position and time data for an observed odor may include, for example, a latitude and longitude of the user device 112 that is determined using the global positioning system (GPS) or another location service, and a time the odor was observed by the user. The observation data may also include a unique identifier of the user device and a description of the odor. In operation, when the user senses, smells, or observes an odor, the user indicates the observation on the user device 112. The user device determines the position of the user device 112 using the GPS system and outputs the user device location and the time of the observation.

In block 204, the processor 102 retrieves weather data that corresponds to the position and time in the received observation data. The weather data includes wind velocity or wind direction and speed. The weather data may be retrieved from any suitable weather source such as, for example, a national or local weather database. For example, when observation data is received by the processor 102, the server retrieves a wind velocity vector for the location and time of the observation. Thus, the wind speed and direction for the observed time and location is retrieved by the processor 102.

In block 206, the processor 102 calculates the odor source location 208 as a function of the observed location, time of the observation, and the wind speed and direction (wind velocity vector).

The processor 102 calculates the odor source location using a probabilistic odor source detection model. First, the probability density function is defined as: $p(x,t;x_R,t_R) = \partial(t-t_R)\partial(x-x_R)$, where x is a position, t is a time, $x_R$ is the observation location, and $t_R$ is the observation time.

A backward evolution equation is used as a function of the retrieved weather data:

$$-\frac{\partial p}{\partial t} = u_i \cdot \frac{\partial p}{\partial x_i} + \frac{\partial}{\partial x_i}\left(\sigma_i \frac{\partial p}{\partial x_i}\right),$$

for $t < t_R$, where $u_i$ is the wind speed, $x_i$ is a direction of the wind (in an x-y coordinate system) and $\sigma_i$ is the diffusion constant or factor of the odor. The diffusion constant of the odor represents a rate at which the odor diffuses in an atmosphere.

A likelihood function of the source location $x_S$ given the detection location $x_R$ is defined as: $L(x_s|x_R) = \int_{t_R}^{t_0} p(x,t;x_R,t_R) dt$. The likelihood function allows the probable location of the source of the odor to be output and plotted on a map in block 210 (described below).

As the user device or multiple user devices continue to output additional position and time data based on user observations, the additional observations are received by the processor 102. As additional observation data is received, the corresponding weather data for each additional observation is retrieved and the functions described above are used to update the likelihood function using the product rule where: $L(x_s|x_R^1, \ldots, x_R^{N}) = L(x_s|x_R^1) \times \ldots \times L(x_s|x_R^{N})$.

In an alternate exemplary embodiment, the method described in FIG. 2 may also be performed by the user device 112 (of FIG. 1). In this regard, the user device receives an input from the user indicating that the user has sensed or detected an odor. The user input may include, for example, selecting a button on a graphical user interface (GUI) of the user device, or another input method such as motion, voice or a textual command. The user device 112 receives the position data using a GPS receiver, and the time of the observation using a clock internal to the user device 112 or an external clock signal such as from the GPS signal in block 202. The user device 112 in block 204 retrieves weather data from a database as described above. The user device 112 calculates or updates the odor source location in block 206. In block 208, the user device 112 presents the odor source location area data to the user on a display of the user device. In some embodiments, the user device 112 may independently perform the method of FIG. 2. The user device 112 may also communicate with other user devices 112 over a network to share position and time observation data, which would increase the size of the observation data set and improve the odor detection activity.

Figure 3:
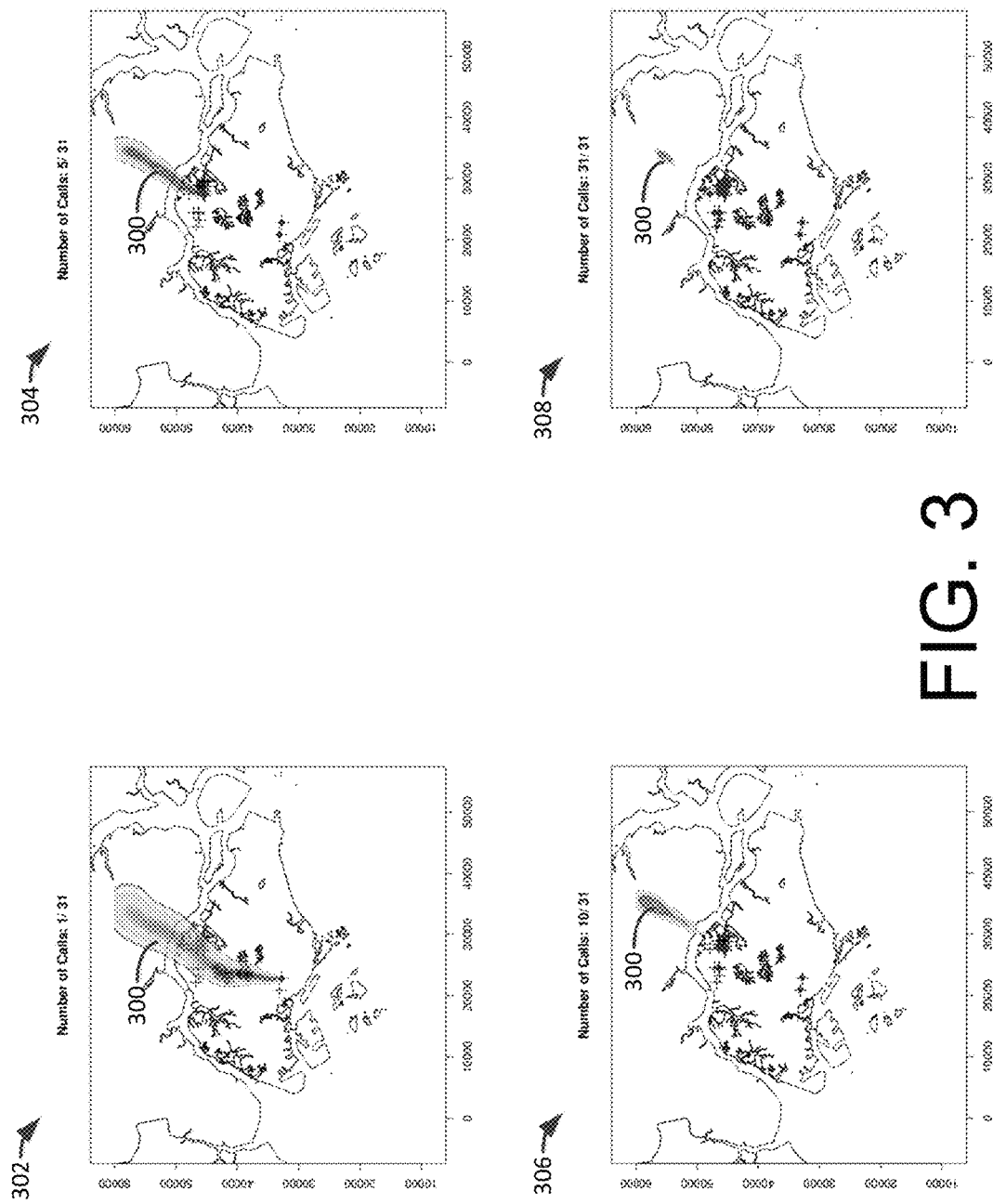
FIG. 3 illustrates an example of the output of the processor.

FIG. 3 illustrates an example of the output of the processor 102 through a progression of observations by a user or users. In the map 302, one observation has been received by the processor 102, which results in a source area 300. Map 304 shows an example of the source area 300 after five observations have been received by the processor 102. The source area 300 in the map 304 is smaller than the source area 300 in the map 302 due to the increase in the number of received observations. Map 306 shows the source area 300 after ten observations have been received. Map 308 illustrates the source area 300 after 31 observations have been received. The source area 300 in the map 308 is smaller than the source area 300 in the map 302. As each additional observation is received by the processor 102, the source area 300 should continue to decrease, thus allowing technicians to have a higher likelihood of locating the source of the odor.

In operation, the processor 102 may output the updated maps 302, 304, 306, and 308 to the user device 112 or multiple user devices 112, or the display 106. The users use the graphical representation of the source area 300 on their user device 112 or on the display 106 to move into the source area 300. By continually moving into the source area 300 and making observations that are sent to the processor 102, the source area 300 should continue to be reduced in size allowing the source of the odor to be more easily found or identified.

Figure 4:
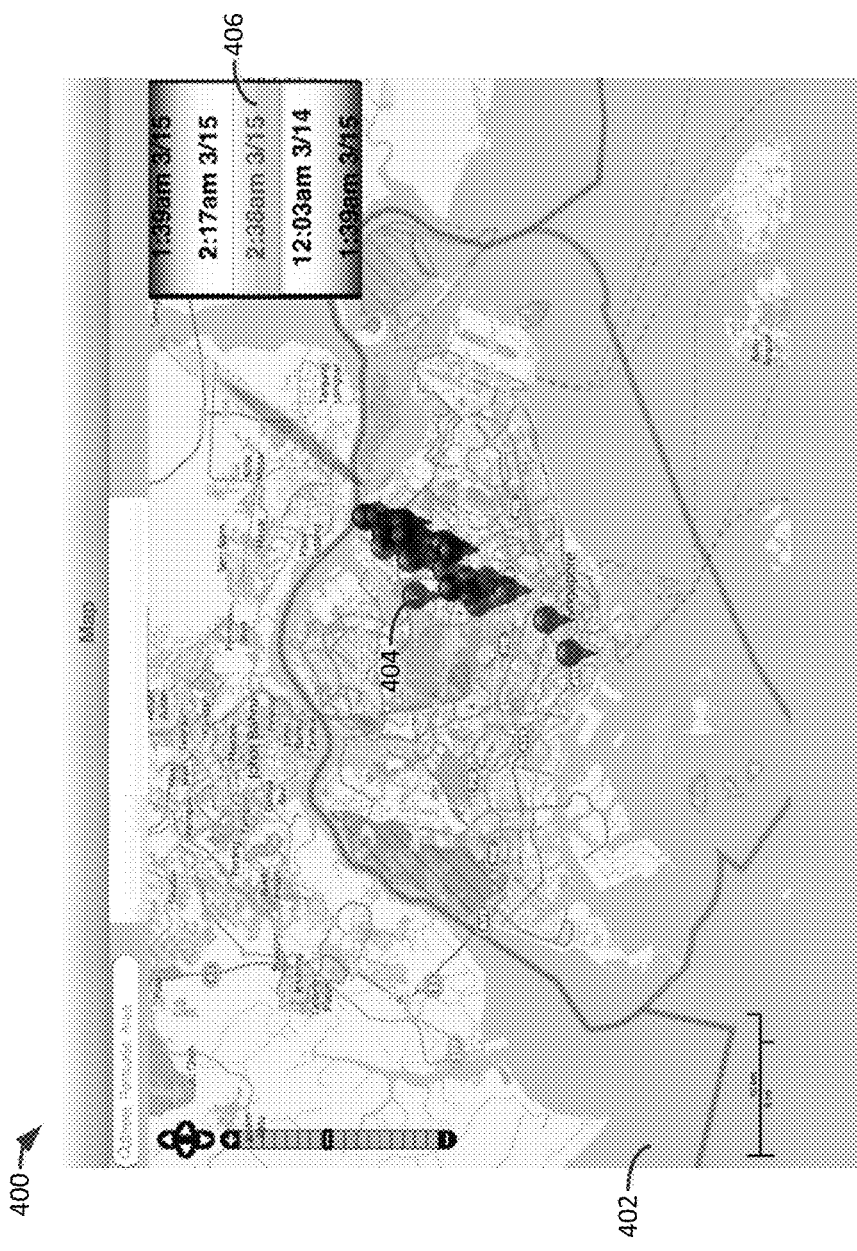
FIG. 4 illustrates an exemplary embodiment of a user interface of the system.

FIG. 4 illustrates an exemplary embodiment of a user interface 400 that may be displayed to a user on the display 106 or the user device 112. The user interface 400 includes a map 402 that shows various geographical features. Observation points 402 are plotted and displayed on the map 402. A menu 406 includes a list of observation times that may be selected by a user. When a user selects one of the observation times, the corresponding observation point 404 plotted on the map 402 that corresponds to the observation time may be highlighted on map 402.

Figure 5:
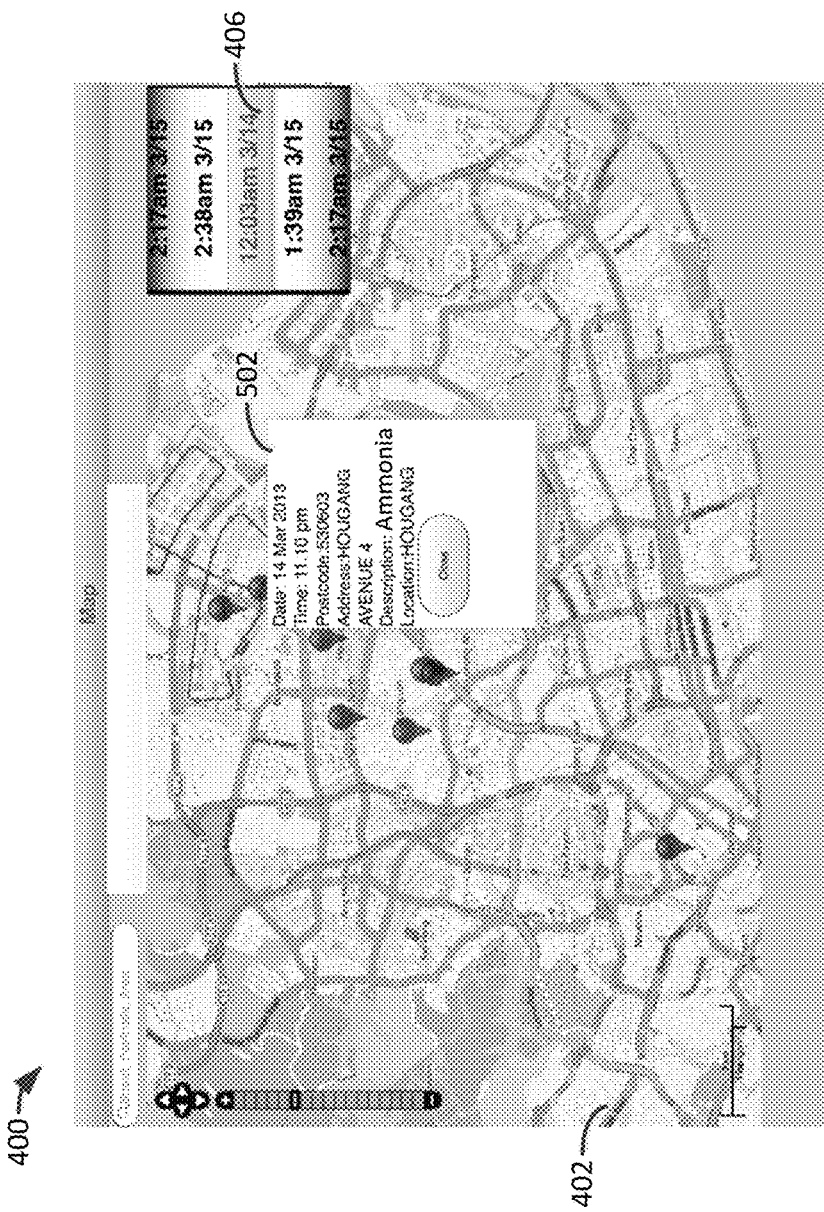
FIG. 5 illustrates another exemplary embodiment of the user interface.

FIG. 5 illustrates an exemplary embodiment of the user interface 400 after an observation time is selected by a user. The illustrated embodiment includes a display window 502 that includes information associated with the observation. In the illustrated embodiment the display window 502 includes the date and time of the observation, the address or geographical location of the observation, a description of the odor, and a general location of the observation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a source of an odor, the method comprising:
   receiving data associated with a first detection of the odor, the data associated with the first detection of the odor comprising a location of the first detection of the odor and a time of the first detection of the odor;
   retrieving weather data corresponding to the first detection of the odor, the weather data including a wind speed and direction in the location of the first detection of the odor at the time of the first detection of the odor;
   calculating a location of the source of the odor as a function of the location of the first detection of the odor, the time of the first location of the odor and the wind speed and direction in the location of the first detection of the odor, each of which is provided by a smart device, comprising a global positioning system, that continually moves into a source area and makes observations to improve odor detection activity and the detecting of the source of the odor, while reducing a size of the source area allowing the source of the odor to be identified; and
   outputting to a user on a display a graphical representation of a likely area that includes the location of the source of the odor,
   wherein the function of the location of the first detection of the odor, the time of the first location of the odor and the wind speed and direction in the location of the first detection of the odor is defined as:

$$-\frac{\partial p}{\partial t} = u_i \cdot \frac{\partial p}{\partial x_i} + \frac{\partial}{\partial x_i}\left(\sigma_i \frac{\partial p}{\partial x_i}\right),$$

for $t < t_R$, where $u_i$ is the wind speed, $x_i$ is a direction of the wind, $\sigma_i$ is a diffusion factor of the odor, $t$ is a time, and $t_R$ is the time of the first detection of the odor.

2. The method of claim 1, wherein $p(x,t;x_R,t_R)=\partial(t-t_R)\partial(x-x_R)$, where p is a probability density function, x is a position, and $x_R$ is location of the first detection of the odor.

3. The method of claim 1, further comprising:
   receiving data associated with a second detection of the odor, the data associated with the second detection of the odor comprising a location of the second detection of the odor and a time of the second detection of the odor;
   retrieving weather data corresponding to the second detection of the odor, the weather data including a wind speed and direction in the location of the second detection of the odor at the time of the second detection of the odor;
   calculating an updated location of the source of the odor as a function of the location of the first detection of the odor, the time of the first location of the odor and the wind speed and direction in the location of the first detection of the odor and the location of the second detection of the odor, the time of the second location of the odor and the wind speed and direction in the location of the second detection of the odor; and
   outputting to a user on a display an graphical representation of an updated likely area that includes the location of the source of the odor.

4. The method of claim 1, wherein the data associated with the first detection of the odor includes a description of the odor.

5. The method of claim 1, wherein the graphical representation of a likely area that includes the location of the source of the odor includes a map, and the graphical representation of the likely area that includes the location of the source of the odor is displayed on the map.

6. The method of claim 1, further comprising displaying the location of the first detection of the odor on a map to the user on the display.

* * * * *